USO12500506B2

United States Patent
Kikuchi et al.

(10) Patent No.: US 12,500,506 B2
(45) Date of Patent: Dec. 16, 2025

(54) POWER CONVERSION SYSTEM AND CONTROL DEVICE FOR SAME

(71) Applicant: Mitsubishi Electric Corporation, Tokyo (JP)

(72) Inventors: Takeshi Kikuchi, Tokyo (JP); Fuminori Nakamura, Tokyo (JP); Ryosuke Uda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 18/251,135

(22) PCT Filed: Nov. 11, 2020

(86) PCT No.: PCT/JP2020/042129
§ 371 (c)(1),
(2) Date: Apr. 28, 2023

(87) PCT Pub. No.: WO2022/102027
PCT Pub. Date: May 19, 2022

(65) Prior Publication Data
US 2024/0333129 A1 Oct. 3, 2024

(51) Int. Cl.
*H02M 1/00* (2007.01)
*H02H 3/033* (2006.01)
(Continued)

(52) U.S. Cl.
CPC ............ *H02M 1/007* (2021.05); *H02H 3/033* (2013.01); *H02J 3/36* (2013.01); *H02M 1/36* (2013.01); *H02M 7/4835* (2021.05)

(58) Field of Classification Search
CPC .......................... H02M 1/0074; H02M 1/0077
See application file for complete search history.

(56) References Cited

U.S. PATENT DOCUMENTS 4,998,098 A * 3/1991 Schweitzer, III ............................
G01R 19/16547
361/17
2015/0171741 A1* 6/2015 Sastry ................. H02M 7/1626
363/40
(Continued)

FOREIGN PATENT DOCUMENTS

JP 2017011992 A 1/2017
JP 2018078733 A 5/2018

OTHER PUBLICATIONS

D. Sha, G. Xu and X. Liao, "Control Strategy for Input-Series-Output-Series High-Frequency AC-Link Inverters," in IEEE Transactions on Power Electronics, vol. 28, No. 11, pp. 5283-5292, Nov. 2013 (Year: 2013).*

(Continued)

*Primary Examiner* — Peter M Novak
(74) *Attorney, Agent, or Firm* — .Buchanan Ingersoll & Rooney PC

(57) ABSTRACT

A power conversion system includes: a self-commutated converter connected between an AC power system, and a first DC main line and a DC return line; a line-commutated converter connected between the AC power system, and the DC return line and a second DC main line; and a control device. When activating the self-commutated converter and the line-commutated converter, the control device activates the self-commutated converter, and after completion of activation of the self-commutated converter, activates the self-commutated converter. The self-commutated converter can be activated first to take advantage of a function of the self-commutated converter that is not included in the separately-commutated converter.

14 Claims, 13 Drawing Sheets

(51) Int. Cl.
   *H02J 3/36*   (2006.01)
   *H02M 1/36*   (2007.01)
   *H02M 7/483*  (2007.01)

(56) References Cited

U.S. PATENT DOCUMENTS

2015/0217660 A1* 8/2015 Manabe ............ H01M 8/04619
                                              307/23
2015/0256094 A1* 9/2015 Chaudhuri .......... H02M 7/7575
                                              363/35
2015/0380942 A1* 12/2015 Premm .................. H02M 7/44
                                              307/52

OTHER PUBLICATIONS

International Search Report (PCT/ISA/210) with English translation and Written Opinion (PCT/ISA/237) mailed on Jan. 19, 2021, by the Japanese Patent Office as the International Searching Authority for International Application No. PCT/JP2020/042129.

International Search Report (PCT/ISA/210) with English translation and Written Opinion (PCT/ISA/237) mailed on Jan. 26, 2021, by the Japanese Patent Office as the International Searching Authority for International Application No. PCT/JP2020/042130.

* cited by examiner

FIG.5
(A)
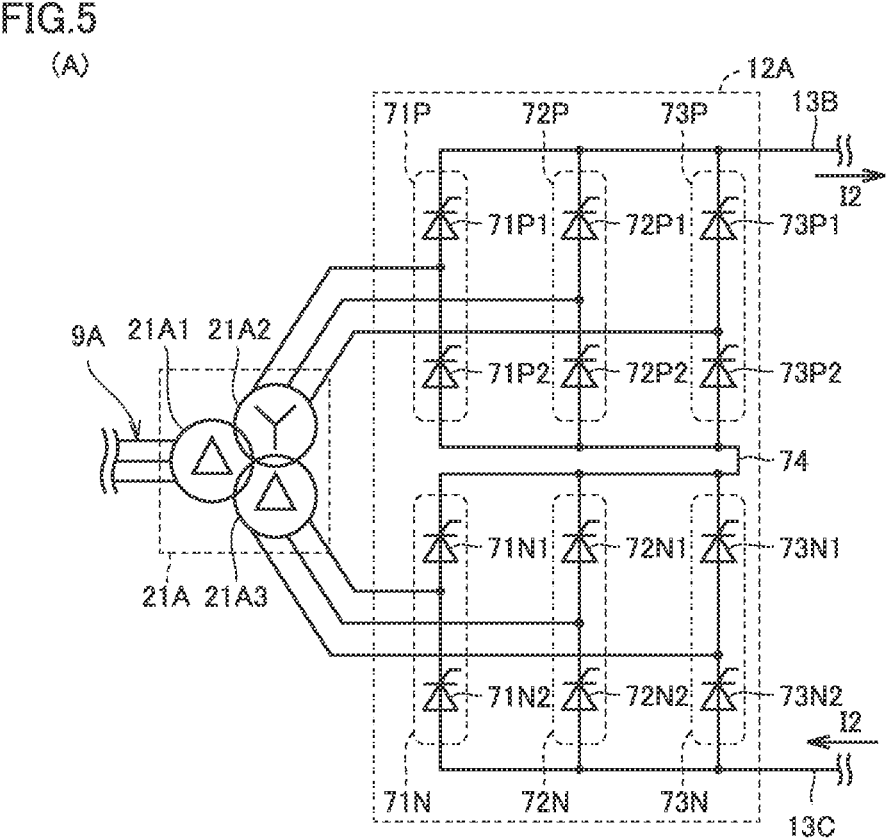
(B)
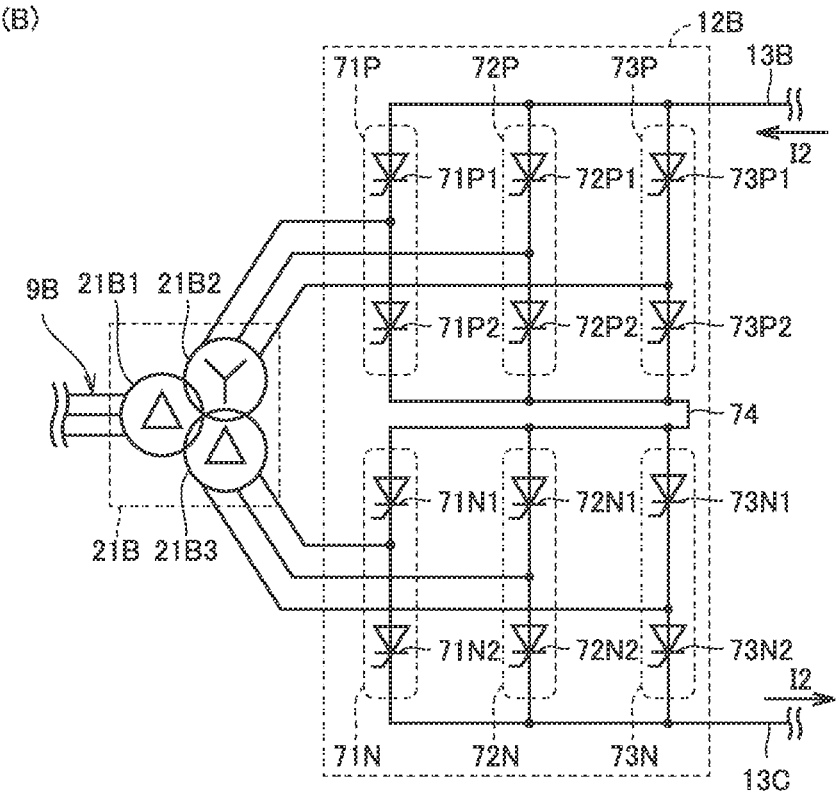

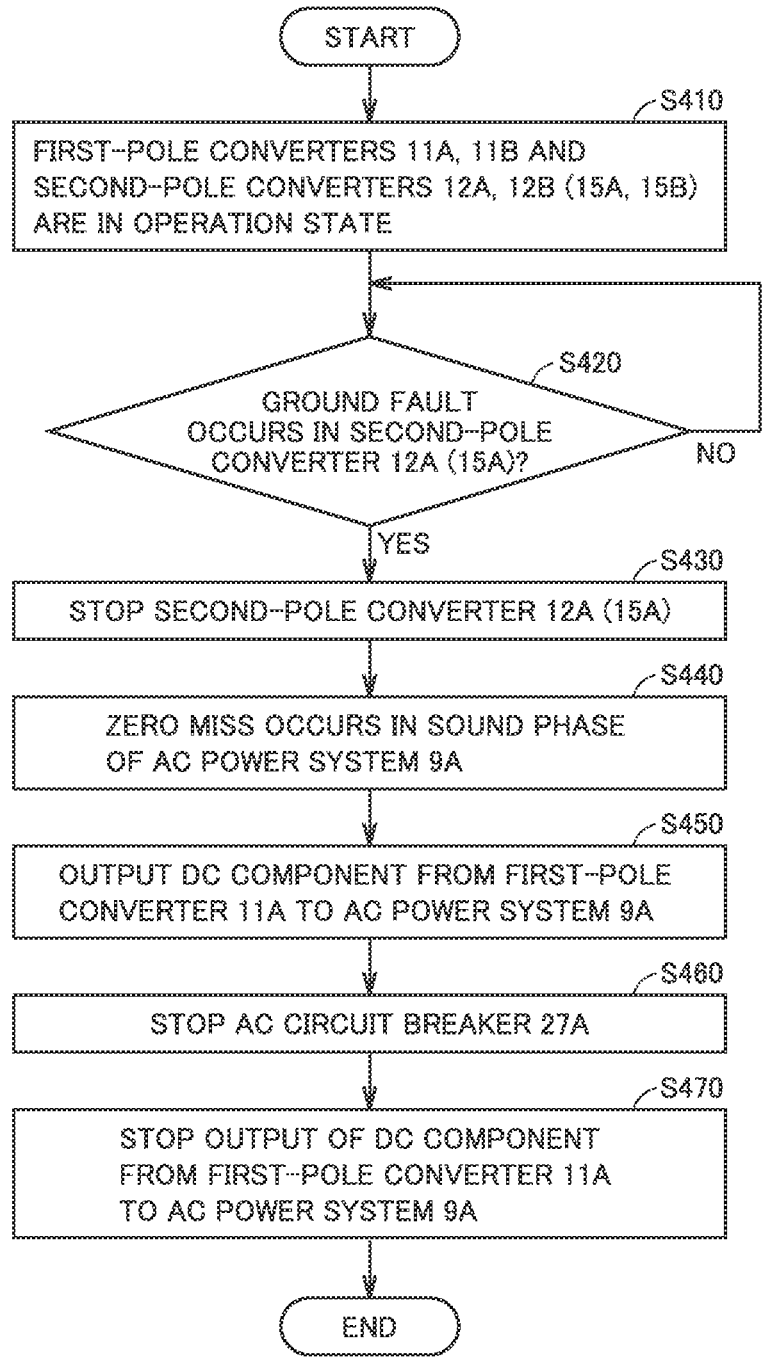

POWER CONVERSION SYSTEM AND CONTROL DEVICE FOR SAME

TECHNICAL FIELD

The present disclosure relates to a power conversion system and a control device thereof.

BACKGROUND ART

A high voltage direct current (HVDC) system is sometimes operated in a bipolar HVDC configuration configured by connecting two HVDCs with a common DC return line to increase power transmission capacity.

In the bipolar HVDC, a facility used for a first-pole HVDC and a facility used for a second-pole HVDC are not necessarily matched with each other. For example, due to different installation timings of the facilities, sometimes the HVDC introduced first is configured by a line-commutated HVDC and the HVDC introduced next is configured by a self-commutated HVDC (for example, see PTL 1 (Japanese Patent Laying-Open No. 2018-078733).

CITATION LIST

Patent Literature

PTL 1: Japanese Patent Laying-Open No. 2018-078733

SUMMARY OF INVENTION

Technical Problem

In a case of the hybrid bipolar HVDC as described above, because the first-pole HVDC and the second-pole HVDC have different functions and characteristics, it is desirable to perform the operation according to the difference. This problem is not limited to the HVDC, but is also applicable to other bipolar power conversion systems such as a back to back (BTB) bipolar power conversion system.

The present disclosure has been made in view of the above points, and an object of the present disclosure is to more appropriately operate a power conversion system according to a difference in a bipolar power conversion system in which functions and characteristics are different between a first-pole power converter and a second-pole power converter. A typical example is a case where the difference in function and characteristics between the first-pole power converter and the second-pole power converter is caused by the difference between the self-commutated type and the line-commutated type. However, the present disclosure is not necessarily limited to this case.

Solution to Problem

A power conversion system according to one embodiment includes: a first self-commutated converter connected between a first AC power system, and a first DC main line and a DC return line; a first line-commutated converter connected between the first AC power system and the DC return line and a second DC main line; and a control device. When activating the first self-commutated converter and the first line-commutated converter, the control device activates the first self-commutated converter, and activates the first line-commutated converter after completing activation of the first self-commutated converter.

Advantageous Effects of Invention

According to the above embodiment, the function of the self-commutated converter that is not included in the line-commutated converter can be used by activating the self-commutated converter first, so that the bipolar power conversion system can be more appropriately operated.

BRIEF DESCRIPTION OF DRAWINGS

FIG. 5 is a view schematically illustrating an example of a hardware configuration of a line-commutated converter.

FIG. 13 is a flowchart illustrating a stop procedure of the second-pole power converter when a ground fault occurs inside the second-pole power converter in a bipolar power conversion system according to a sixth embodiment.

DESCRIPTION OF EMBODIMENTS

Hereinafter, embodiments will be described in detail with reference to the drawings. Like or corresponding parts are denoted by like reference signs, and a description thereof will not be repeated.

First Embodiment

[Overall Configuration of Bipolar Power Conversion System]

Figure 1:
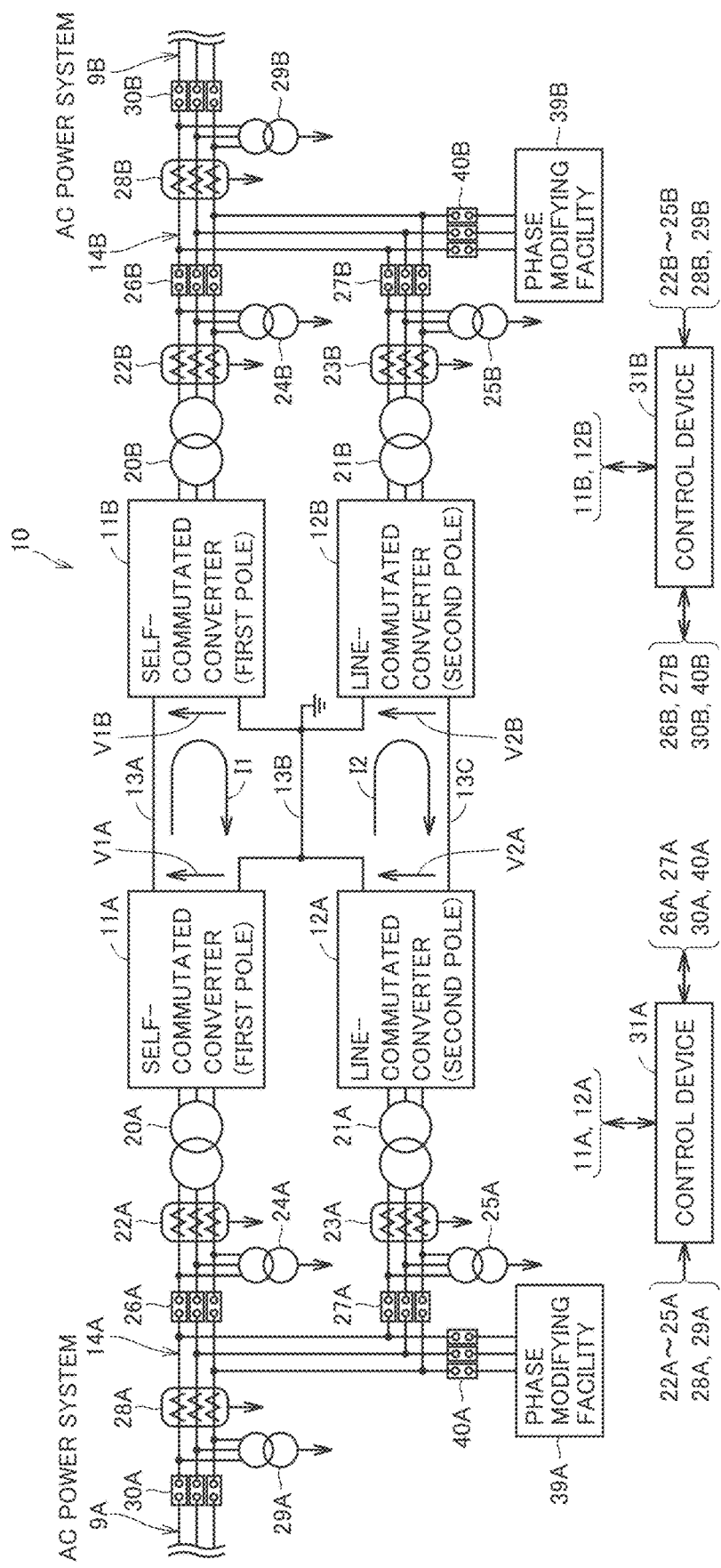
FIG. 1 is a circuit diagram illustrating a configuration example of a bipolar power conversion system.

FIG. 1 is a circuit diagram illustrating a configuration example of a bipolar power conversion system. With reference to FIG. 1, a bipolar power conversion system 10 includes first-pole power converters 11A, 11B, second-pole power converters 12A, 12B, and control devices 31A, 31B.

In FIG. 1, first-pole power converters 11A, 11B are self-commutated converters, and second-pole power converters 12A, 12B are line-commutated converters. In the present disclosure, first-pole power converter 11A is also referred to as a first self-commutated converter, and first-pole power converter 11B is also referred to as a second self-commutated converter. Second-pole power converter 12A is also referred to as a first line-commutated converter, and second-pole power converter 12B is also referred to as a second line-commutated converter.

Here, the self-commutated converter is a power converter configured with a semiconductor switching element having self-arc-extinguishing capability such as an insulated gate bipolar transistor (IGBT). The line-commutated converter is a power converter configured with a semiconductor switching element having no self-arc-extinguishing capability such as a thyristor.

First-pole power converter 11A is connected between an AC power system 9A and DC lines configured with a DC main line 13A and a DC return line 13B. First-pole power converter 11B is connected between the DC lines (DC main line 13A, DC return line 13B) and an AC power system 9B. In the present disclosure, AC power system 9A is also referred to as a first AC power system, and AC power system 9B is also referred to as a second AC power system.

Second-pole power converter 12A is connected between AC power system 9A and DC lines configured with a DC main line 13C and DC return line 13B. Second-pole power converter 12B is connected between the DC lines (DC main line 13C, DC return line 13B) and AC power system 9B. As described above, DC return line 13B is shared between the first-pole power converter and the second-pole power converter, so that current flowing through DC return line 13B can be reduced.

Specifically, the case where power converters 11A, 12A function as forward converters and power converters 11B, 12B function as inverse converters will be described. In this case, as illustrated in FIG. 1, a DC current I1 flows due to a potential difference between a DC voltage V1A output from power converter 11A and a DC voltage V1B output from power converter 11B. Furthermore, a DC current I2 flows due to a potential difference between a DC voltage V2A output from power converter 12A and a DC voltage V2B output from power converter 12B. DC current I1 and DC current I2 flowing through DC return line 13B are currents in opposite directions.

As illustrated in FIG. 1, bipolar power conversion system 10 further includes AC circuit breakers 30A, 26A, 27A, 40A, voltage transformers 29A, 24A, 25A, current transformers 28A, 22A, 23A, and transformers 20A, 21A.

AC circuit breaker 30A is provided on a three-phase line constituting AC power system 9A. AC circuit breaker 26A is connected between a branch point 14A of the three-phase line and first-pole power converter 11A. AC circuit breaker 27A is connected between branch point 14A and second-pole power converter 12A. AC circuit breaker 40A is used for separating a phase modifying facility 39A described later from AC power system 9A. Voltage transformer 29A and current transformer 28A are connected between AC circuit breaker 30A and branch point 14A. Voltage transformer 24A and current transformer 22A are connected between branch point 14A and first-pole power converter 11A. Voltage transformer 25A and current transformer 23A are connected between branch point 14A and second-pole power converter 12A.

Transformer 20A is connected between voltage transformer 24A and current transformer 22A, and first-pole power converter 11A. Transformer 21A is connected between voltage transformer 25A and current transformer 23A, and second-pole power converter 12A. An interconnection reactor may be used instead of transformers 20A, 21A.

Similarly to the above, bipolar power conversion system 10 further includes AC circuit breakers 30B, 26B, 27B, 40B, voltage transformers 29B, 24B, 25B, current transformers 28B, 22B, 23B, and transformers 20B, 21B. These dispositions on the side of AC power system 9B are similar to the dispositions on the side of AC power system 9A described above, and when A at the end of the reference numeral is replaced with B, the disposition is established as it is, and thus the description will not be repeated. In the following description, matters common to the device on the side of AC power system 9A and the device on the side of AC power system 9B will be described without adding A, B at the end of the reference signs.

Bipolar power conversion system 10 further includes control devices 31A, 31B and phase modifying facilities 39A, 39B.

Control device 31A controls the operations of first-pole power converter 11A and second-pole power converter 12A based on current signals output from current transformers 22A, 23A, 28A and voltage signals output from voltage transformers 24A, 25A, 29A. Similarly, control device 31B controls the operations of first-pole power converter 11B and second-pole power converter 12B based on current signals output from current transformers 22B, 23B, 28B and voltage signals output from voltage transformers 24B, 25B, 29B. Further, control device 31A controls opening and closing of circuit breakers 30A, 26A, 27A, 40A, and control device 31B controls opening and closing of circuit breakers 30B, 26B, 27B, 40B.

Phase modifying facility 39A is connected to the AC power system 9A side of line-commutated power converter 12A, and phase modifying facility 39B is connected to the AC power system 9B side of line-commutated power converter 12B. In the case of FIG. 1, phase modifying facility 39A is connected to branch point 14A of AC power system 9A with AC circuit breaker 40A interposed therebetween. Similarly, phase modifying facility 39B is connected to branch point 14A of AC power system 9B with AC circuit breaker 40B interposed therebetween.

The line-commutated converter is controlled so as to delay an ignition phase to obtain a desired voltage, so that a current phase is delayed with respect to a voltage phase. In order to compensate for the phase delay, phase modifying facilities 39A, 39B include static capacitors (also referred to as shunt capacitors). That is, each of phase modifying facilities 39A, 39B compensates for the inductive reactive power output from the corresponding line-commutated converter by outputting the capacitive reactive power.

[Functional Configuration of Control Device]

Figure 2:
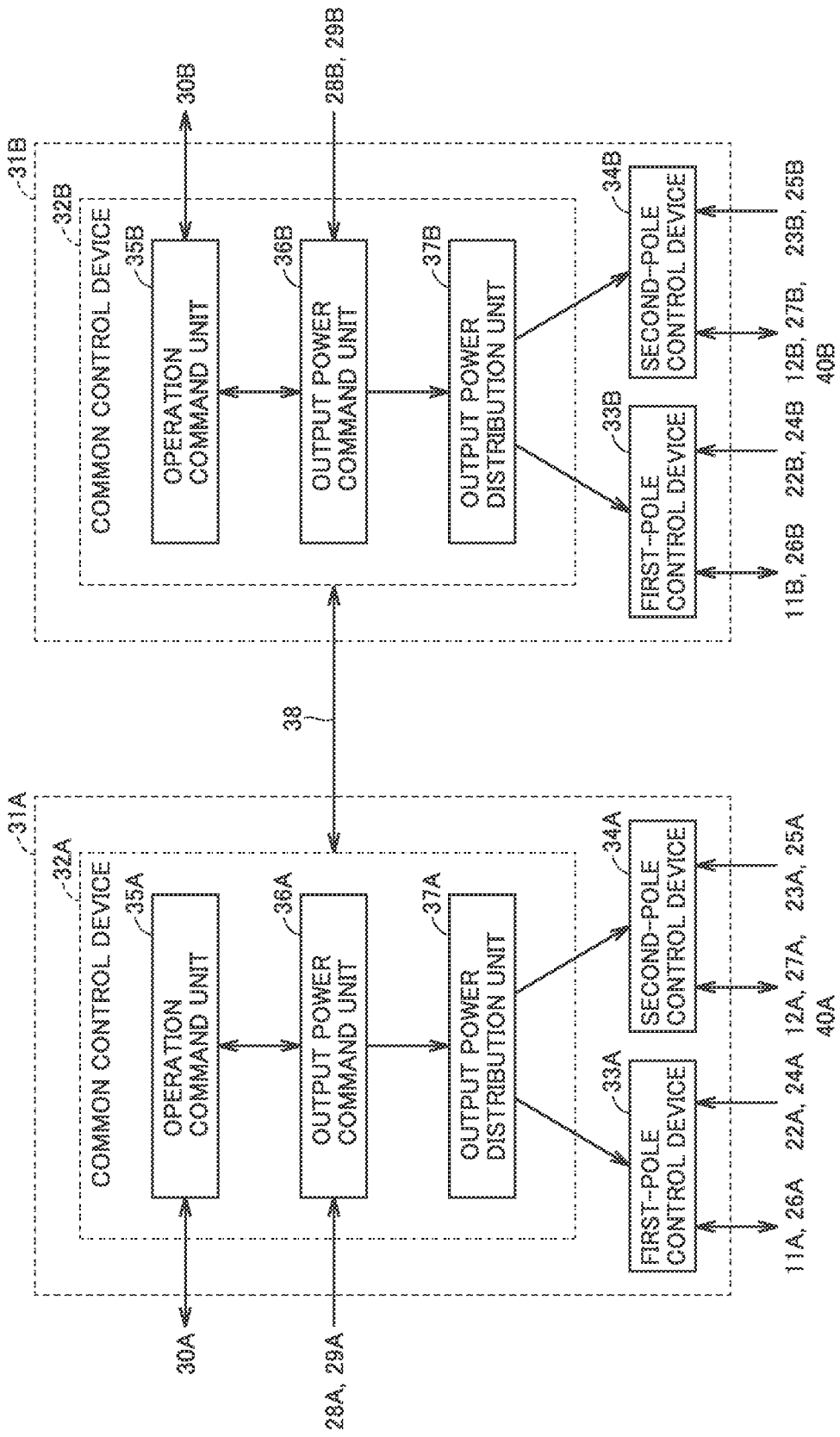
FIG. 2 is a block diagram illustrating a functional configuration of a control device in FIG. 1.

FIG. 2 is a block diagram illustrating a functional configuration of the control device in FIG. 1. FIG. 2 illustrates an example in which bipolar power conversion system 10 is an HVDC system.

With reference to FIG. 2, control device 31A includes a common control device 32A, a first-pole control device 33A, and a second-pole control device 34A. A common control device 32A includes an operation command unit 35A, an output power command unit 36A, and an output power distribution unit 37A.

Similarly, control device 31B includes a common control device 32B, a first-pole control device 33B, and a second-pole control device 34B. Common control device 32B includes an operation command unit 35B, an output power command unit 36B, and an output power distribution unit 37B. Common control device 32A and common control device 32B exchange information with each other through a communication line 38.

Specifically, operation command unit 35A commands first-pole control device 33A to start and stop the operation of first-pole power converter 11A, and commands second-pole control device 34A to start and stop the operation of second-pole power converter 12A. Furthermore, operation command unit 35A controls opening and closing of AC circuit breaker 30A.

Output power command unit 36A generates an active power command value PrefA and a reactive power command value QrefA based on the detection values of current transformer 28A and voltage transformer 29A. Output power distribution unit 37A distributes each of active power command value PrefA and reactive power command value QrefA to the first-pole control device and the second-pole control device. Because there is the difference in function and characteristics between the first-pole power converter and the second-pole power converter, it is not always appropriate that active power command value PrefA and reactive power command value QrefB are equally distributed to the first-pole control device and the second-pole control device.

First-pole control device 33A controls the operation of first-pole power converter 11A based on active power command value PrefA1 and reactive power command value QrefA1 that are received from common control device 32A, and also based on the detection values of current transformer 22A and voltage transformer 24A. second-pole control device 34A controls the operation of second-pole power converter 12A based on active power command value PrefA2 and reactive power command value QrefA2 that are received from common control device 32A, and also based on the detection values of current transformer 23A and voltage transformer 25A. Furthermore, first-pole control device 33A controls the opening and closing operation of AC circuit breaker 26A, and second-pole control device 34A controls the opening and closing operation of AC circuit breakers 27A, 40A.

Functions of control device 31B controlling first-pole power converter 11B and second-pole power converter 12B are similar to those described above, and in the above description, "A" at the end of the reference numeral may be replaced with "B", and thus the description will not be repeated. Hereinafter, in the case where the function common between first-pole power converters 11A, 11B is described, it is simply referred to as first-pole power converter 11. Similarly, in the case where the function common to second-pole power converters 12A, 12B is described, it is simply referred to as second-pole power converter 12.

When bipolar power conversion system 10 is a BTB system, common control device 32A and common control device 32B may be provided in common.

Hardware Configuration Example of Self-Commutated Converter

Figure 3:
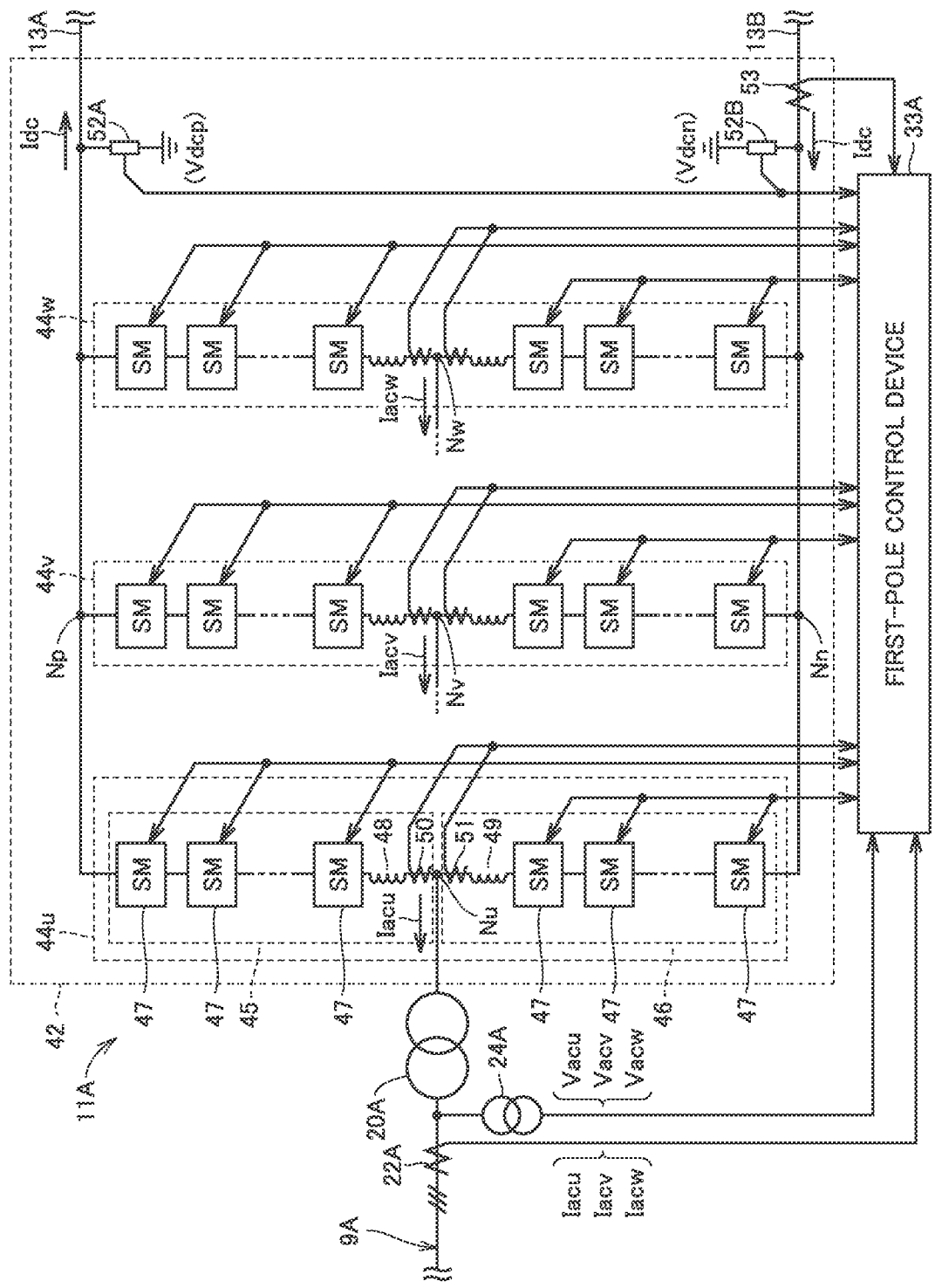
FIG. 3 is a view illustrating an example of a schematic hardware configuration of a self-commutated converter in FIG. 1.

FIG. 3 is a view illustrating an example of a schematic hardware configuration of the self-commutated converter in FIG. 1. FIG. 3 illustrates a configuration example of power converter 11A, and the configuration of power converter 11B is similar.

With reference to FIG. 3, power converter 11A is configured of a modular multilevel converter including a plurality of converter cells 47 connected in series to each other. The "converter cell" is also referred to as a "sub-module" or a "unit converter". Power converter 11A performs power conversion between the DC lines (DC main line 13A, DC return line 13B) and AC power system 9A.

Power converter 11A includes a plurality of leg circuits 44u, 44v, 44w (also referred to as "leg circuit 44" in the case where the leg circuits are collectively called or in the case where an arbitrary leg circuit is indicated) connected in parallel to each other between a positive electrode DC terminal (that is, a high potential-side DC terminal) Np and a negative electrode DC terminal (that is, a low potential-side DC terminal) Nn.

Leg circuit 44 is provided in each of a plurality of phases constituting alternating current. Leg circuit 44 is connected between AC power system 9A and DC lines 13A, 13B, and performs the power conversion between both circuits. In FIG. 3, three leg circuits 44u, 44v, 44w are provided corresponding to a U phase, a V phase, a W phase, respectively.

AC input terminals Nu, Nv, Nw provided in leg circuits 44u, 44v, 44w are connected to AC power system 9A with transformer 20A interposed therebetween. In FIG. 3, the connection between AC input terminals Nv, Nw and transformer 20A is not illustrated for ease of illustration.

High potential-side DC terminal Np and low potential-side DC terminal Nn that are commonly connected to each leg circuit 44 are connected to DC main line 13A and DC return line 13B, respectively.

A primary winding may be provided in each of leg circuits 44u, 44v, 44w instead of AC input terminals Nu, Nv, Nw in FIG. 3, and leg circuits 44u, 44v, 44w may be connected to transformer 20A or the interconnection reactor in terms of AC through a secondary winding magnetically coupled to the primary winding. In this case, the primary winding may be set to following reactors 48A, 48B.

Leg circuit 44u includes an upper arm 45 from high potential-side DC terminal Np to AC input terminal Nu and a lower arm 46 from low potential-side DC terminal Nn to AC input terminal Nu. AC input terminal Nu that is the connection point between upper arm 45 and lower arm 46 is connected to transformer 20A. Hereinafter, leg circuit 44u will be described below as a representative because leg circuits 44v, 44w have the same configuration.

Upper arm 45 includes a plurality of converter cells 47 connected in cascade and a reactor 48. The plurality of converter cells 47 and reactor 48 are connected in series. Similarly, lower arm 46 includes the plurality of converter cells 47 connected in cascade and a reactor 49. The plurality of converter cells 47 and reactor 49 are connected in series. The current circulating in power converter 11A can be prevented by providing reactors 48, 49, and furthermore, a rapid increase in a fault current in the event of a fault in AC power system 9A, DC lines 13A, 13B, or the like can be prevented.

Power converter 11A further includes voltage transformer 24A, current transformer 22A, DC voltage detectors 52A, 52B, current transformers 50, 51 provided in each leg circuit 44, and DC current detector 53 as detectors that measure an electric quantity (for example, current and voltage) used for control. Signals detected by these detectors are input to first-pole control device 33A.

In FIG. 3, for ease of illustration, a signal line of the signal input from each detector to first-pole control device 33A and a signal line of the signal input and output between first-pole control device 33A and each converter cell 47 are partially collectively illustrated, but are actually provided for each detector and each converter cell 47. The signal line between each converter cell 47 and first-pole control device 33A may be provided separately for transmission and for reception. For example, the signal line is formed of an optical fiber.

Each detector will be specifically described below.

Voltage transformer 24A detects a U-phase AC voltage Vacu, a V-phase AC voltage Vacv, and a W-phase AC voltage Vacw of AC power system 9A. Current transformer 22A detects a U-phase AC current Iacu, a V-phase AC current Iacv, and a W-phase AC current Iacw of AC power system 9A.

DC voltage detector 52A detects a DC voltage Vdcp of high potential-side DC terminal Np connected to DC main line 13A. DC voltage detector 52B detects a DC voltage Vdcn of low potential-side DC terminal Nn connected to DC return line 13B. A difference between DC voltage Vdcp and DC voltage Vden is defined as a DC voltage Vdc. DC current detector 53 detects a DC current Idc (equal to DC current I1 in FIG. 1) flowing through high potential-side DC terminal Np or low potential-side DC terminal Nn.

Current transformers 50, 51 provided in U-phase leg circuit 44u detect an upper arm current Ipu flowing through upper arm 45 and a lower arm current Inu flowing through lower arm 46, respectively. Current transformers 50, 51 provided in V-phase leg circuit 44v detect an upper arm current Ipv and a lower arm current Inv, respectively. Current transformers 50, 51 provided in W-phase leg circuit 44w detect an upper arm current Ipw and a lower arm current Inw, respectively.

Configuration Example of Converter Cell

Figure 4:
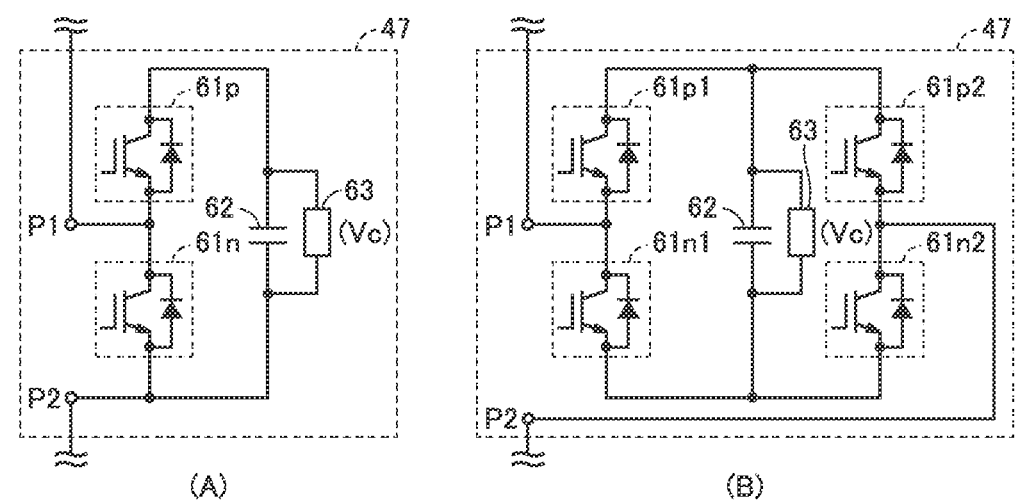
FIG. 4 is a circuit diagram illustrating a configuration example of a converter cell constituting the self-commutated power converter in FIG. 3.

FIG. 4 is a circuit diagram illustrating a configuration example of converter cell 47 constituting the self-commutated power converter in FIG. 3.

Converter cell 47 in FIG. 4(A) has a circuit configuration called a half-bridge configuration. Converter cell 47 includes a series combination formed by connecting two switching elements 61p, 61n in series, an energy storage device 62, a voltage detector 63, and input and output terminals P1, P2. The series combination of switching elements 61p, 61n and energy storage device 62 are connected in parallel. Voltage detector 63 detects a voltage Vc across energy storage device 62.

Both terminals of switching element 61n are connected to input and output terminals P1, P2, respectively. Converter cell 47 outputs voltage Vc of energy storage device 62 or zero voltage between input and output terminals P1, P2 by switching operation of switching elements 61p, 61n. When switching element 61p is turned on and switching element 61n is turned off, voltage Vc of energy storage device 62 is output from converter cell 47. When switching element 61p is turned off and switching element 61n is turned on, converter cell 47 output the zero voltage.

Converter cell 47 in FIG. 4(B) has a circuit configuration called a full-bridge configuration. Converter cell 47 includes a first series combination formed by connecting two switching elements 61p1, 61n1 in series, a second series combination formed by connecting two switching elements 61p2, 61n2 in series, energy storage device 62, voltage detector 63, and input and output terminals P1, P2. The first series combination, the second series combination, and energy storage device 62 are connected in parallel. Voltage detector 63 detects voltage Vc across energy storage device 62.

A midpoint of switching element 61p1 and switching element 61n1 is connected to input and output terminal P1. Similarly, the midpoint of switching element 61p2 and switching element 61n2 is connected to input and output terminal P2. Converter cell 47 outputs voltage Vc,-Vc of energy storage device 62 or zero voltage between input and output terminals P1, P2 by switching operation of switching elements 61p1, 61n1, 61p2, 61n2.

In FIGS. 4(A) and 4(B), switching elements 61p, 61n, 61p1, 61n1, 61p2, 61n2 are configured by connecting a freewheeling diode (FWD) in antiparallel to a self-extinguishing semiconductor switching element such as an insulated gate bipolar transistor (IGBT) or a gate commutated turn-off (GCT) thyristor. Hereinafter, the term "switching element 61" will be used in referring to switching elements 61p, 61n, 61p1, 61n1, 61p2, 61n2 collectively or any one thereof.

In FIGS. 4(A) and 4(B), a capacitor such as a film capacitor is mainly used as energy storage device 62. Energy storage device 62 may be referred to as a capacitor in the following description. Hereinafter, voltage Vc of energy storage device 62 is also referred to as a capacitor voltage Vc.

As illustrated in FIG. 3, converter cells 47 are connected in cascade. In each of FIGS. 4(A) and 4(B), in converter cell 47 disposed in upper arm 45, input and output terminal P1 is connected to input and output terminal P2 of adjacent converter cell 47 or high potential-side DC terminal Np, and input and output terminal P2 is connected to input and output terminal P1 of adjacent converter cell 47 or AC input terminal Nu. Similarly, in converter cell 47 disposed in lower arm 46, input and output terminal P1 is connected to input and output terminal P2 of adjacent converter cell 47 or AC input terminal Nu, and input and output terminal P2 is connected to input and output terminal P1 of adjacent converter cell 47 or low potential-side DC terminal Nn.

A converter cell other than the configuration described above, for example, a converter cell to which a circuit configuration called a clamped double cell or the like is applied may be used, and the switching element and the energy storage device are not limited to those described above.

Hardware Configuration Example of
Line-Commutated Converter

FIG. 5 is a view schematically illustrating an example of a hardware configuration of the line-commutated converter. FIG. 5(A) illustrates a configuration example of power converter 12A in FIG. 1 used as the forward converter, and FIG. 5(B) illustrates a configuration example of power converter 12B in FIG. 1 used as the inverse converter. FIGS. 5(A) and 5(B) also illustrate configuration examples of transformers 21A, 21B.

With reference to FIG. 5(A), line-commutated power converter 12A includes thyristor units 71P, 72P, 73P connected in parallel to each other between DC return line 13B and connection point 74. Thyristor units 71P, 72P, 73P include a series circuit of thyristors 71P1, 71P2, a series circuit of thyristors 72P1, 72P2, and a series circuit of thyristors 73P1, 73P2, respectively.

Power converter 12A further includes thyristor units 71N, 72N, 73N connected in parallel to each other between connection point 74 and DC main line 13C. Thyristor units 71N, 72N, 73N include a series circuit of thyristors 71N1, 71N2, a series circuit of thyristors 72N1, 72N2, and a series circuit of thyristors 73N1, 73N2, respectively.

Each thyristor has a cathode on the side of DC return line 13B, and an anode on the side of DC main line 13C. Second-pole control device 34A provides a gate pulse signal to each thyristor for controlling each thyristor.

Transformer 21A includes a delta winding 21A1, a Y-winding 21A2, and a delta winding 21A3. Delta winding 21A1, Y-winding 21A2, and delta winding 21A3 are magnetically coupled to one another. Each of the u-phase, the v-phase, and the w-phase of AC power system 9A is connected to delta winding 21A1. The connection point between thyristors 71P1, 71P2, the connection point between thyristors 72P1, 72P2, and the connection point between thyristors 73P1, 73 P2 are connected to Y-winding 21A2. The connection point between thyristors 71N1, 71N2, the connection point between thyristors 72N1, 72N2, and the connection point between thyristors 73N1, 73N2 are connected to delta winding 21A3.

A circuit configuration of line-commutated power converter 12B used as the inverse converter is illustrated in FIG. 5(B). Power converter 12B in FIG. 5(B) is different from power converter 12A in FIG. 5(A) in that the anode of each thyristor is connected to the side of DC return line 13B and the cathode is connected to the side of DC main line 13C. Because other points of power converter 12B in FIG. 5(B) are similar to those in the case of FIG. 5(A), the corresponding components are denoted by the same reference numerals, and the description thereof will not be repeated.

Transformer 21B also includes a delta winding 21B1, a Y-winding 21B2, and a delta winding 21B3. Delta winding 21B1, Y-winding 21B2, and delta winding 21B3 in FIG. 5(B) correspond to delta winding 21A1, Y-winding 21A2, and delta winding 21A3 in FIG. 5(A), respectively. Because the connection between delta winding 21B1 and AC power system 9B and the connection between Y-winding 21B2 and each thyristor as well as delta winding 21B3 and each thyristor are the same as those in the case of FIG. 5(B), the description thereof will not be repeated.

[Functional Difference Between Self-Commutated Converter and Line-Commutated Converter]

A functional difference between the self-commutated converter and the line-commutated converter will be described below.

The self-commutated converter is characterized in that the active power and the reactive power to be output can be independently controlled. This is because the self-commutated converter can freely control a magnitude and a phase of an output voltage. Specifically, each of first-pole control device 33A and second-pole control device 34A controls the corresponding power conversion device in accordance with an active power command value and a reactive power command value received from common control device 32A.

For example, in the case of the MMC described with reference to FIGS. 3 and 4, each of first-pole control device 33A and second-pole control device 34A calculates an active current value and a reactive current value from an actual measurement value of AC voltage of each phase and an actual measurement value of AC current of each phase. Each of first-pole control device 33A and second-pole control device 34A calculates an active voltage command value based on a deviation between an active current command value calculated from the active power command value and the above-described active current value (for example, by performing a proportional-integral operation on the deviation). Similarly, each of first-pole control device 33A and second-pole control device 34A calculates a reactive voltage command value based on a deviation between a reactive current command value calculated from the reactive power command value and the above-described reactive current value (for example, by performing a proportional-integral operation on the deviation). Subsequently, each of first-pole control device 33A and second-pole control device 34A performs two-phase/three-phase conversion on the calculated active voltage command value and reactive voltage command value to calculate an arm voltage command value of each phase. For example, the two-phase/three-phase conversion can be implemented by inverse Park conversion and inverse Clarke conversion. Alternatively, the two-phase/three-phase conversion can also be implemented by the inverse-Park conversion and space vector conversion. Each of first-pole control device 33A and second-pole control device 34A controls output of converter cells 47 provided in each phase arm based on the calculated arm voltage command value of each phase.

On the other hand, although line-commutated converter can control active power, a value of output reactive power is determined according to the active power. As described above, because the line-commutated converter is controlled so as to delay an ignition phase to obtain a desired voltage, a magnitude of an output voltage can be freely controlled, but a phase of the output voltage cannot be freely controlled. Specifically, a current phase is delayed with respect to a voltage phase. Accordingly, the line-commutated converter outputs inductive reactive power having a magnitude corresponding to an output of an active power.

Figure 6:
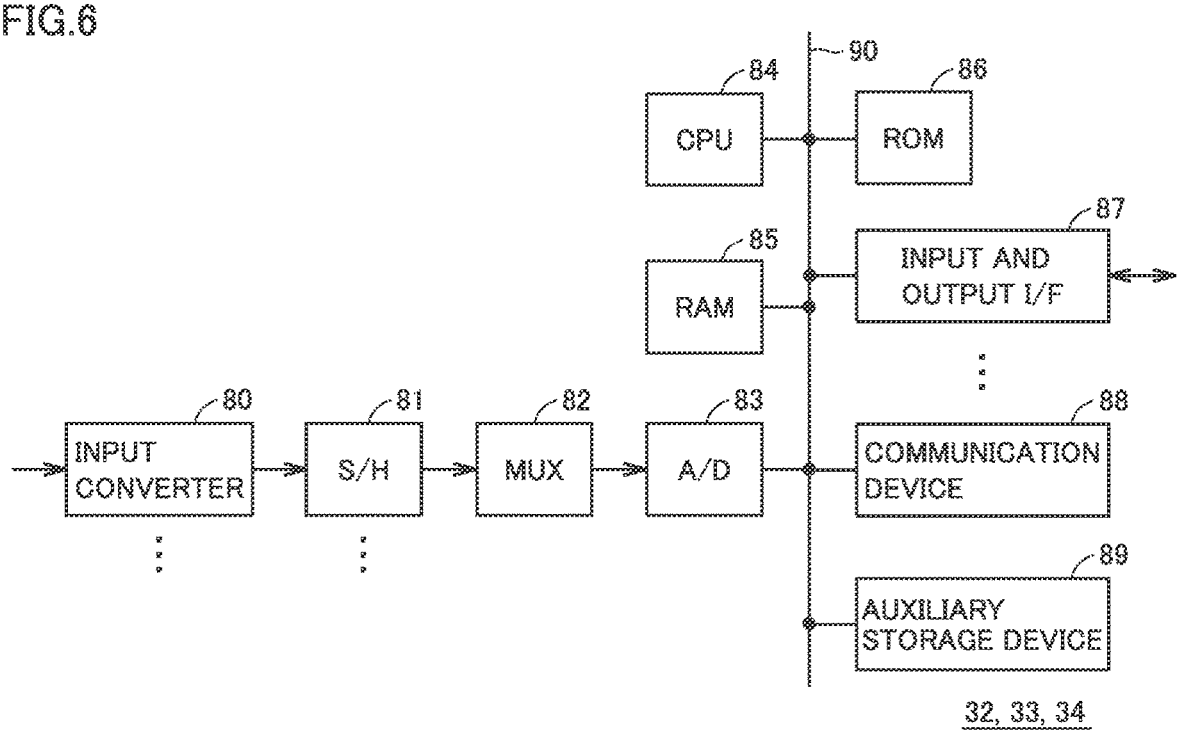
FIG. 6 is a block diagram illustrating hardware configuration examples of a common control device, a first-pole control device, and a second-pole control device in FIG. 2.

Hardware Configuration Examples of Common Control Device, First-Pole Control Device, and Second-Pole Control Device FIG. 6 is a block diagram illustrating hardware configuration examples of the common control device, the first-pole control device, and the second-pole control device in FIG. 2. FIG. 6 illustrates an example in which each control device is configured by a computer.

With reference to FIG. 6, each control device includes at least one input converter 80, at least one sample hold (S/H) circuit 81, a multiplexer (MUX) 82, and an analog to digital (A/D) converter 83. Each control device further includes at least one central processing unit (CPU) 84, a random access memory (RAM) 85, and a read only memory (ROM) 86. Furthermore, each control device includes at least one input and output interface 87 and an auxiliary storage device 89. In particular, common control device 32 includes a communication device 88 performing communication (that is, transmission and reception of information) through communication line 38 in FIG. 2. Each control device further includes a bus 90 that interconnects the above-described components.

Input converter 80 includes an auxiliary transformer (not illustrated) for each input channel. Each auxiliary transformer converts a detection signal by each current transformer and voltage transformer in FIG. 1 into a signal of a voltage level suitable for subsequent signal processing.

Sample hold circuit 81 is provided for each input converter 80. Sample hold circuit 81 samples and holds a signal representing the electric quantity received from corresponding input converter 80 at a specified sampling frequency.

Multiplexer 82 sequentially selects the signals held in the plurality of sample hold circuits 81. A/D converter 83 converts the signal selected by multiplexer 82 into a digital value. A/D conversion may be executed in parallel for detection signals of a plurality of input channels by providing a plurality of A/D converters 83.

CPU 84 controls the entire control device and executes arithmetic processing in accordance with a program. RAM 85 as a volatile memory and ROM 86 as a nonvolatile memory are used as main storage of CPU 84. ROM 86 stores a program, a setting value for signal processing, and the like. Auxiliary storage device 89 is a nonvolatile memory having a larger capacity than ROM 86, and stores a program, data of an electric quantity detection value, and the like.

Input and output interface 87 is an interface circuit for communication between CPU 84 and an external device.

Unlike the example in FIG. 6, at least a part of each control device can be configured using a circuit such as a field programmable gate array (FPGA) or an application specific integrated circuit (ASIC). That is, the function of each functional block in FIG. 3 can be configured on a basis of the computer in FIG. 6, or at least a part thereof can be configured using the circuit such as the FPGA and the ASIC. In addition, at least a part of the function of each functional block can be configured by an analog circuit.

[Operation of Bipolar Power Conversion System]

A characteristic operation of bipolar power conversion system 10 will be described below. In the first embodiment, a black start procedure when AC power system 9A fails will be described. The black start is to supply power in order to eliminate the power failure from the blackout state.

Figure 7:
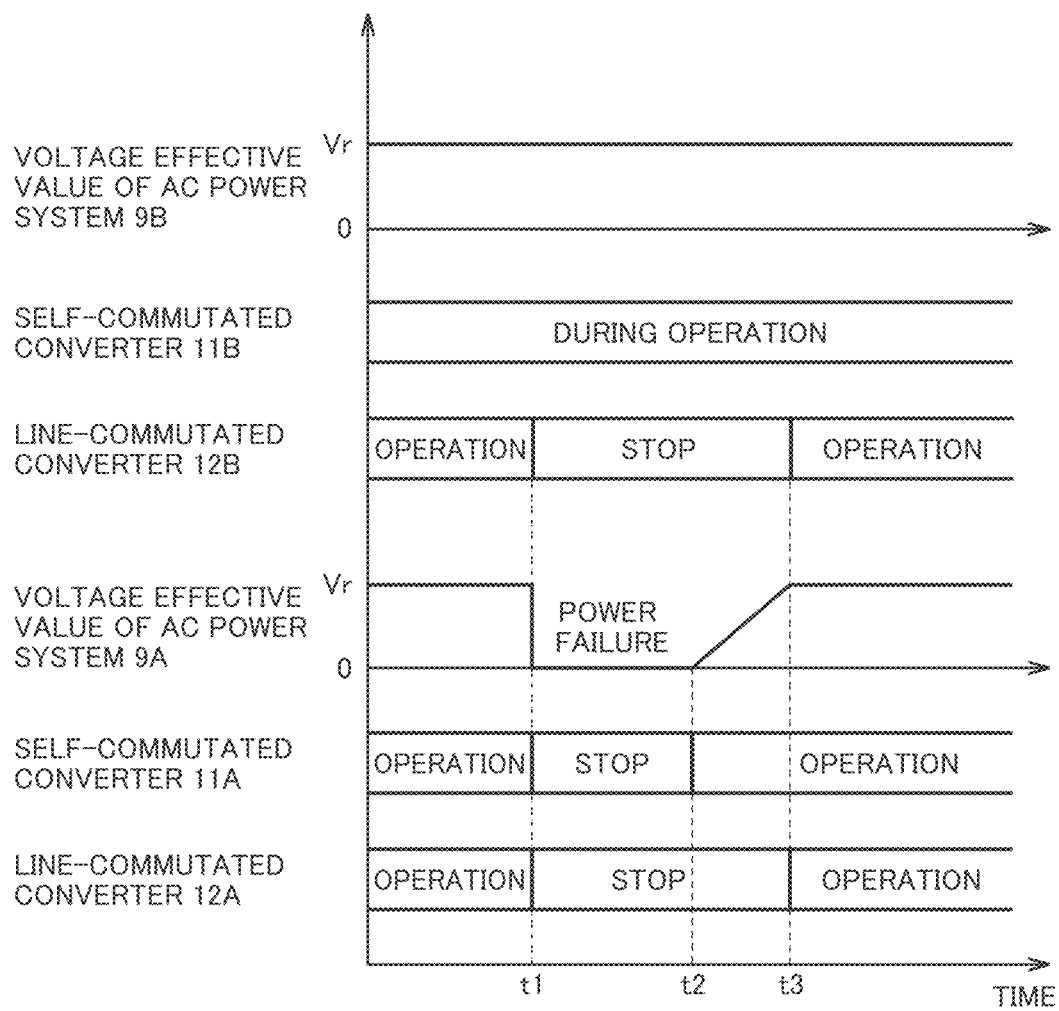
FIG. 7 is a timing chart illustrating a black start procedure.

FIG. 7 is a timing chart illustrating the black start procedure. FIG. 7 illustrates the voltage effective value of AC power system 9B, the operation state of self-commutated power converter 11B, the operation state of line-commutated power converter 12B, the voltage effective value of AC power system 9A, the operation state of self-commutated power converter 11A, and the operation state of line-commutated power converter 12A in order from the top.

It is assumed that the power failure (blackout) occurs in AC power system 9A at a time t1. Accordingly, self-commutated power converter 11A and line-commutated power converters 12A, 12B connected to AC power system 9A are stopped. At this time, because no power failure occurs in AC power system 9B, the voltage effective value is equal to a rated voltage Vr (or within a rated range). Self-commutated power converter 11B connected to AC power system 9B remains in the operation state.

More specifically, when detecting that the voltage at AC power system 9A is zero voltage (or less than or equal to a threshold) based on the detection value of voltage transformer 24A, first-pole control device 33A opens AC circuit breaker 26A and controls the switching elements of converter cells 47 constituting self-commutated power converter 11A to be in the off state. As a result, self-commutated power converter 11A stops. The voltage at energy storage device 62 of each of converter cells 47 constituting self-commutated power converter 11A is maintained by voltage supply from self-commutated power converter 11B through DC lines 13A, 13B.

When detecting that the voltage at AC power system 9A is zero voltage (or less than or equal to the threshold) based on the detection value of voltage transformer 25A, second-pole control device 34A opens AC circuit breaker 27A and sets gate voltage supplied to each thyristor constituting line-commutated power converter 12A to zero. As a result, line-commutated power converter 12A stops. Second-pole control device 34A notifies common control device 32A that line-commutated power converter 12A is stopped.

When receiving information that line-commutated power converter 12A stops from common control device 32A on the side of AC power system 9A through communication line 38, common control device 32B on the side of AC power system 9B issues a stop command of line-commutated power converter 12B to second-pole control device 34B. When receiving the stop command of line-commutated power converter 12B, second-pole control device 34B opens AC circuit breaker 27B and sets gate voltage supplied to each thyristor constituting line-commutated power converter 12B to zero. As a result, line-commutated power converter 12B stops.

At a next time t2, common control device 32A starts the operation of self-commutated power converter 11A. Self-commutated power converter 11A can be activated by active power received from self-commutated power converter 11B through DC lines 13A, 13B. On the other hand, line-commutated power converter 12A cannot be activated when AC power system 9A is in the power failure.

More specifically, first-pole control device 33A closes AC circuit breaker 26A in accordance with an operation start command from common control device 32A, and starts supply of the AC power to AC power system 9A by causing switching elements 61 of converter cells 47 constituting self-commutated power converter 11A to switch. When the AC voltage detected by voltage transformer 24A reaches rated voltage Vr (or within the rated range), first-pole control device 33A determines that the activation of first-pole power converter 11A is completed.

At a next time t3, common control device 32A starts the activation of line-commutated power converters 12A, 12B when the activation of the self-commutated power converter 11A is completed. At time t3 when the activation of self-commutated power converter 11A is completed, the voltage effective value of AC power system 9A returns to rated voltage Vr (or within the rated range), so that line-commutated power converter 12A can be activated.

More specifically, when the AC voltage at AC power system 9A reaches rated voltage Vr (or within the rated range), common control device 32A issues an activation command of line-commutated power converter 12A to second-pole control device 34A, and common control device 32B issues an activation command of line-commutated power converter 12B to second-pole control device 34B. When receiving the activation command of line-commutated power converter 12A, second-pole control device 34A closes AC circuit breaker 27A and supplies a gate pulse to each thyristor constituting line-commutated power converter 12A to operate each thyristor. Similarly, when receiving the activation command of line-commutated power converter 12B, second-pole control device 34B closes AC circuit breaker 27B and supplies a gate pulse to each thyristor constituting line-commutated power converter 12B to operate each thyristor.

Advantageous Effect of First Embodiment

In bipolar power conversion system 10 of the first embodiment described above, the self-commutated power conversion device performs the black start, so that the line-commutated power conversion device can be started thereafter. Although the bipolar power conversion system configured of only the line-commutated power converter cannot perform the black start, hybrid bipolar power conversion system 10 can perform the black start.

Second Embodiment

In a second embodiment, a normal activation procedure of power converters 11A, 11B, 12A, 12B in the bipolar power conversion system 10 will be described. According to this activation procedure, there is an advantage that phase modifying facilities 39A, 39B are not required to be provided. The configuration of bipolar power conversion system 10 described with reference to FIGS. 1 to 6 is the same in the second embodiment except for phase modifying facilities 39A, 39B, and thus the description thereof will not be repeated.

Figure 8:
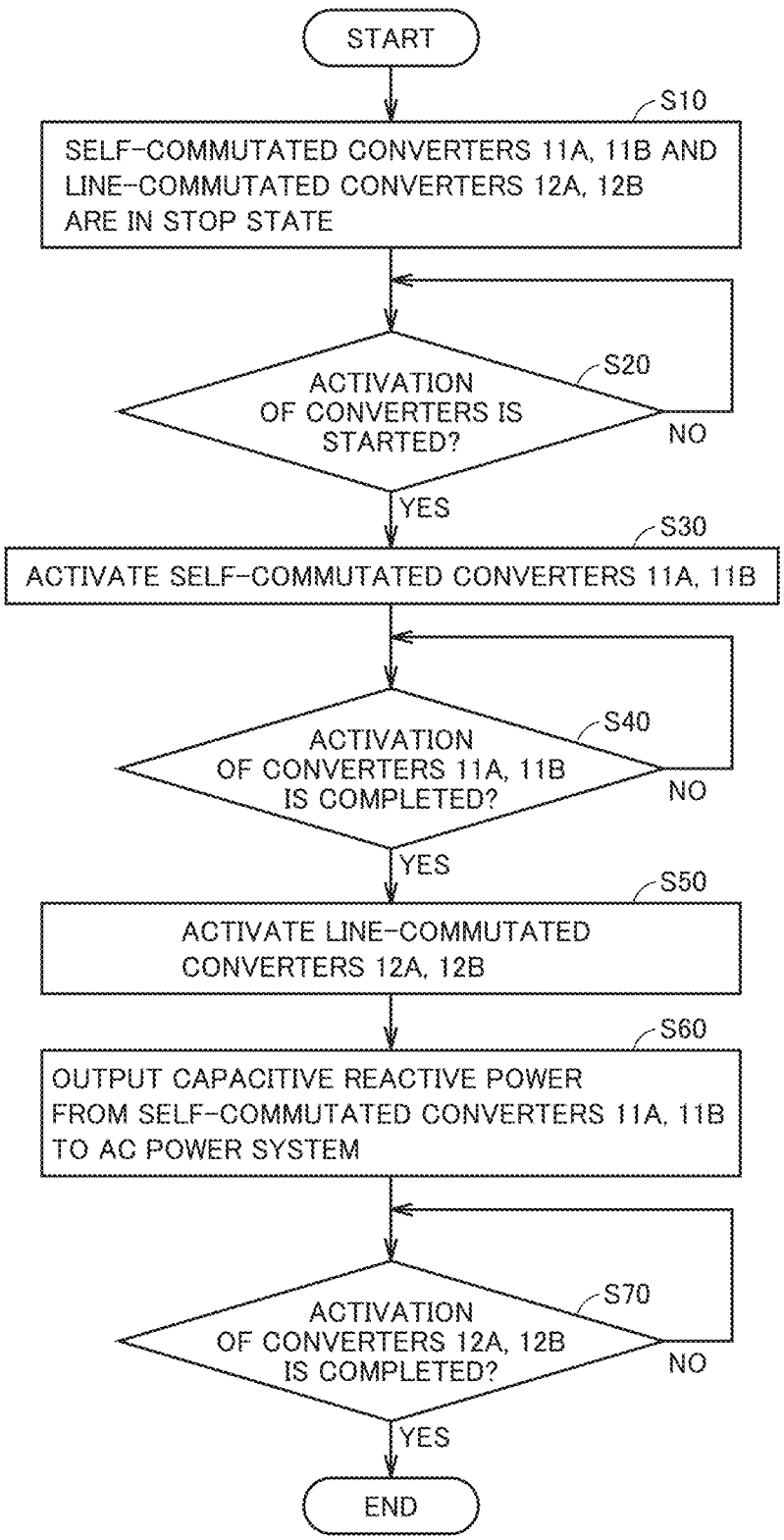
FIG. 8 is a flowchart illustrating an activation procedure of a power converter in a bipolar power conversion system according to a second embodiment.

FIG. 8 is a flowchart illustrating the activation procedure of the power converter in the bipolar power conversion system of the second embodiment.

In step S10, it is assumed that self-commutated power converters 11A, 11B and line-commutated power converters 12A, 12B are in a stop state. When starting the activation of power converters 11A, 11B, 12A, 12B, common control devices 32A, 32B advance the processing to step S30.

In step S30, common control device 32A starts the activation of self-commutated power converter 11A, and common control device 32B starts the activation of self-commutated power converter 11B. More specifically, first-pole control device 33A closes AC circuit breaker 26A in accordance with the operation start command from common control device 32A, and first-pole control device 33B closes AC circuit breaker 26B in accordance with the operation start command from common control device 32B. Thus, charge of energy storage devices 62 of respective converter cells 47 constituting self-commutated power converter 11A is started, and the charge of energy storage devices 62 of respective converter cells 47 constituting self-commutated power converter 11B is started. When the voltage value at each energy storage device 62 reaches the specified value, first-pole control device 33A causes power converter 11A to start the power conversion operation by causing switching element 61 of each converter cell 47 to switch. Similarly, when the voltage value at each energy storage device 62 reaches the specified value, first-pole control device 33B causes power converter 11B to start the power conversion operation by causing switching element 61 of each converter cell 47 to switch. Thus, the activation of self-commutated power converters 11A, 11B is completed.

When the activation of self-commutated power converters 11A, 11B is completed (YES in step S40), common control devices 32A, 32B advance the processing to step S50.

In step S50, common control device 32A activates line-commutated power converter 12A, and common control device 32B activates line-commutated power converter 12B. More specifically, second-pole control device 34A closes AC circuit breaker 27A in accordance with an operation start command from common control device 32A, and supplies a gate pulse to each thyristor included in line-commutated power converter 12A to operate each thyristor. Similarly, second-pole control device 34B closes AC circuit breaker 27B in accordance with the operation start command from common control device 32B, and supplies a gate pulse to each thyristor included in line-commutated power converter 12B to operate each thyristor.

In next step S60, common control device 32A causes self-commutated power converter 11A to output the capacitive reactive power to AC power system 9A. In addition, common control device 32B causes self-commutated power converter 11B to output the capacitive reactive power to AC power system 9B. The capacitive reactive power in this case compensates for the phase delay of the output current with respect to the phase of the output voltage when line-commutated power converters 12A, 12B are activated.

More specifically, common control device 32A calculates inductive reactive power output from line-commutated power converter 12A to AC power system 9A based on the voltage value and the current value of AC power system 9A detected by voltage transformer 29A and current transformer 28A. Common control device 32A provides capacitive reactive power required for canceling the inductive reactive power as a reactive power command value to first-pole control device 33A. First-pole control device 33A controls self-commutated power converter 11A in accordance with the given reactive power command value.

Similarly, common control device 32B calculates inductive reactive power output from line-commutated power converter 12B to AC power system 9B based on the voltage value and the current value of AC power system 9B detected by voltage transformer 29B and current transformer 28B. Common control device 32B provides capacitive reactive power required for canceling the inductive reactive power as a reactive power command value to first-pole control device 33B. First-pole control device 33B controls self-commutated power converter 11B in accordance with the given reactive power command value.

When the activation of line-commutated power converters 12A, 12B is completed (YES in step S70), common control devices 32A, 32B end the activation processing of bipolar power conversion system 10.

According to the second embodiment, self-commutated power converters 11A, 11B are activated first, and capacitive reactive power is output to AC power systems 9A, 9B by self-commutated power converters 11A, 11B. This eliminates the need for phase modifying facility 39A, 39B (static capacitors, shunt reactors, and the like) required for activation and operation of line-commutated power converters 12A, 12B, thereby enabling cost reduction of bipolar power conversion system 10.

Third Embodiment

In a third embodiment, a normal stop procedure of power converters 11A, 11B, 12A, 12B in bipolar power conversion system 10 will be described. According to this stop procedure, bipolar power conversion system 10 can be stably stopped even when the system voltage rises due to the influence of the phase modifying facility (in particular, a static capacitor) when the line-commutated converter is stopped. The configuration of bipolar power conversion system 10 described with reference to FIGS. 1 to 6 is similar in the case of the third embodiment, and thus the description will not be repeated.

Figure 9:
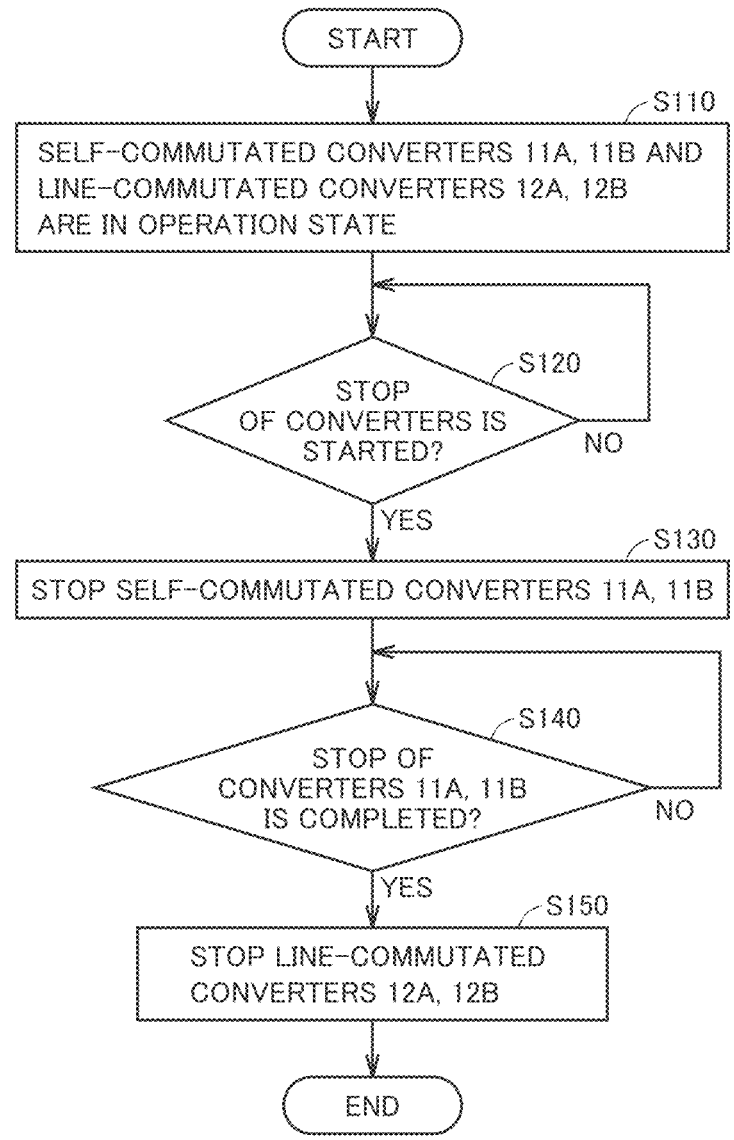
FIG. 9 is a flowchart illustrating a stop procedure of a power converter in a bipolar power conversion system according to a third embodiment.

FIG. 9 is a flowchart illustrating the stop procedure of the power converter in the bipolar power conversion system of the third embodiment.

In step S110, it is assumed that self-commutated power converters 11A, 11B and line-commutated power converters 12A, 12B are in the operation state. When the stop of power converters 11A, 11B, 12A, 12B is started (YES in step S120), common control devices 32A, 32B advance the processing to step S130.

In step S130, common control device 32A stops self-commutated power converter 11A, and common control device 32B stops self-commutated power converter 11B. More specifically, first-pole control device 33A opens AC circuit breaker 26A in accordance with a stop command from common control device 32A, and controls the switching elements of converter cells 47 constituting self-commutated power converter 11A to be turned off. As a result, self-commutated power converter 11A stops. Similarly, first-pole control device 33B opens AC circuit breaker 26B in accordance with a stop command from common control device 32B, and controls the switching elements of converter cells 47 constituting self-commutated power converter 11B to be turned off. As a result, self-commutated power converter 11B stops.

When the stop of self-commutated power converters 11A, 11B is completed (YES in step S140), common control devices 32A, 32B advance the processing to step S150.

In step S150, common control device 32A stops line-commutated power converter 12A, and common control device 32B stops line-commutated power converter 12B. More specifically, in accordance with a stop command from common control device 32, second-pole control device 34A opens AC circuit breaker 27A and sets gate voltage supplied to each thyristor included in line-commutated power converter 12A to zero. As a result, line-commutated power converter 12A stops. Similarly, second-pole control device 34B opens AC circuit breaker 27B in accordance with a stop command from common control device 32, and sets gate voltage supplied to each thyristor constituting line-commutated power converter 12B to zero. As a result, line-commutated power converter 12B stops.

According to bipolar power conversion system 10 of the third embodiment, even when the system voltage rises due to the influence of the phase modifying facility (in particular, a static capacitor) when the line-commutated converter is stopped, self-commutated power converters 11A, 11B are already stopped, thereby being not affected by the rise in the system voltage.

Fourth Embodiment

A fourth embodiment illustrates a modification of the third embodiment. Because the configuration of bipolar power conversion system 10 described with reference to FIGS. 1 to 6 is similar to the case of the fourth embodiment, the description will not be repeated.

Figure 10:
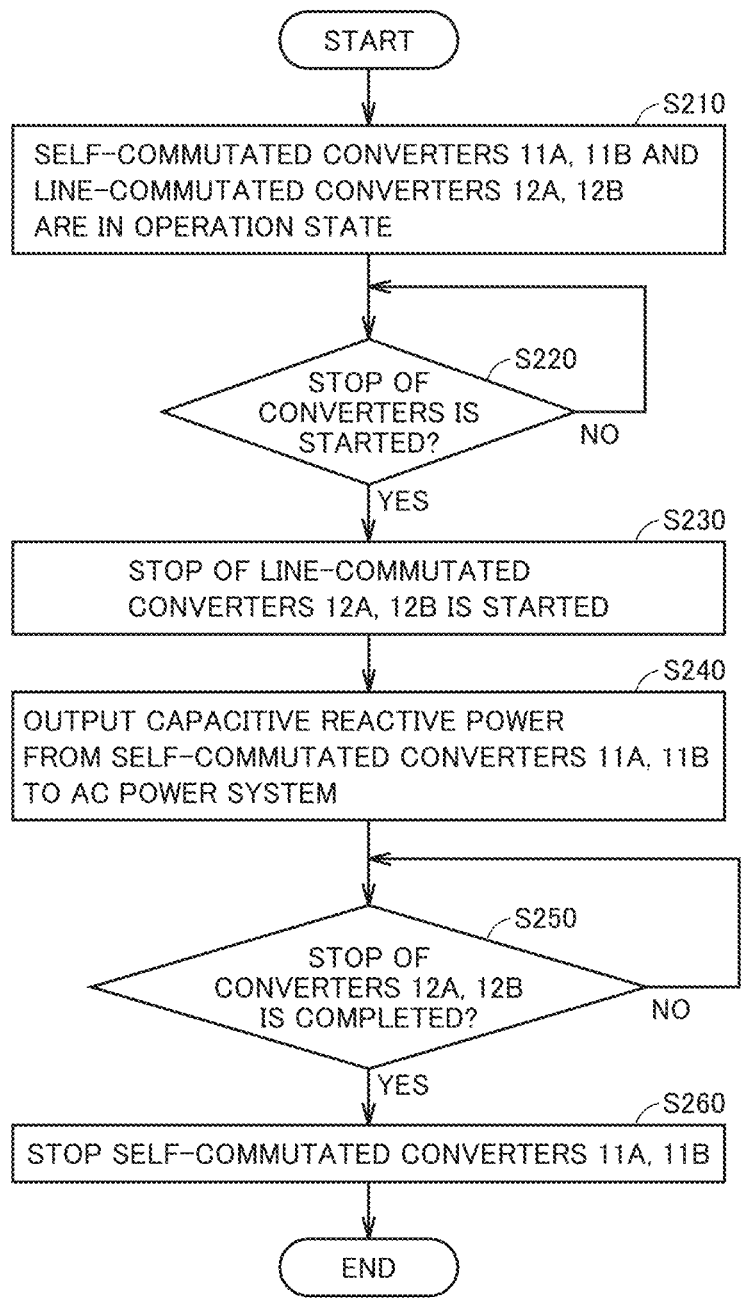
FIG. 10 is a flowchart illustrating a stop procedure of a power converter in a bipolar power conversion system according to a fourth embodiment.

FIG. 10 is a flowchart illustrating a stop procedure of the power converter in the bipolar power conversion system of the fourth embodiment.

In step S210, it is assumed that self-commutated power converters 11A, 11B and line-commutated power converters 12A, 12B are in the operation state. When the stop of power converters 11A, 11B, 12A, 12B is started (YES in step S220), common control devices 32A, 32B advance the processing to step S230.

In step S230, common control device 32A starts the stop of line-commutated power converter 12A, and common control device 32B starts the stop of line-commutated power converter 12B. More specifically, because the processing is similar to step S150 in FIG. 9, the description thereof will not be repeated.

In next step S240, common control device 32A causes self-commutated power converter 11A to output inductive reactive power, and common control device 32B causes self-commutated power converter 11B to output inductive reactive power. The inductive reactive power is output to prevent an increase in the system voltage due to the influence of the phase modifying facility (in particular, the static capacitor) when line-commutated converter is stopped.

More specifically, common control device 32A calculates capacitive reactive power output from phase modifying facility 39A to AC power system 9A based on the voltage value and the current value of AC power system 9A detected by voltage transformer 29A and current transformer 28A. Common control device 32A provides inductive reactive power required for canceling the capacitive reactive power as a reactive power command value to first-pole control device 33A. First-pole control device 33A controls self-commutated power converter 11A in accordance with the given reactive power command value.

Similarly, common control device 32B calculates capacitive reactive power output from phase modifying facility 39B to AC power system 9B based on the voltage value and the current value of AC power system 9B detected by voltage transformer 29B and current transformer 28B. Common control device 32B provides inductive reactive power required for canceling the capacitive reactive power as a reactive power command value to first-pole control device 33B. First-pole control device 33B controls self-commutated power converter 11B in accordance with the given reactive power command value.

When the stop of line-commutated power converters 12A, 12B is completed (YES in step S250), common control devices 32A, 32B advance the processing to step S260.

In step S260, common control device 32A stops self-commutated power converter 11A, and common control device 32B stops self-commutated power converter 11B. More specifically, because the processing is similar to step S130 in FIG. 9, the description thereof will not be repeated.

According to bipolar power conversion system 10 of the fourth embodiment, even when the system voltage rises due to the influence of the phase modifying facility (in particular, the static capacitor) when the line-commutated converter is stopped, inductive reactive power is output from self-commutated power converters 11A, 11B, so that the influence of the rise in the system voltage can be prevented.

Fifth Embodiment

In a bipolar power conversion system 10 according to a fifth embodiment, the case where a fault occurs in AC power system 9A will be described.

Figure 11:
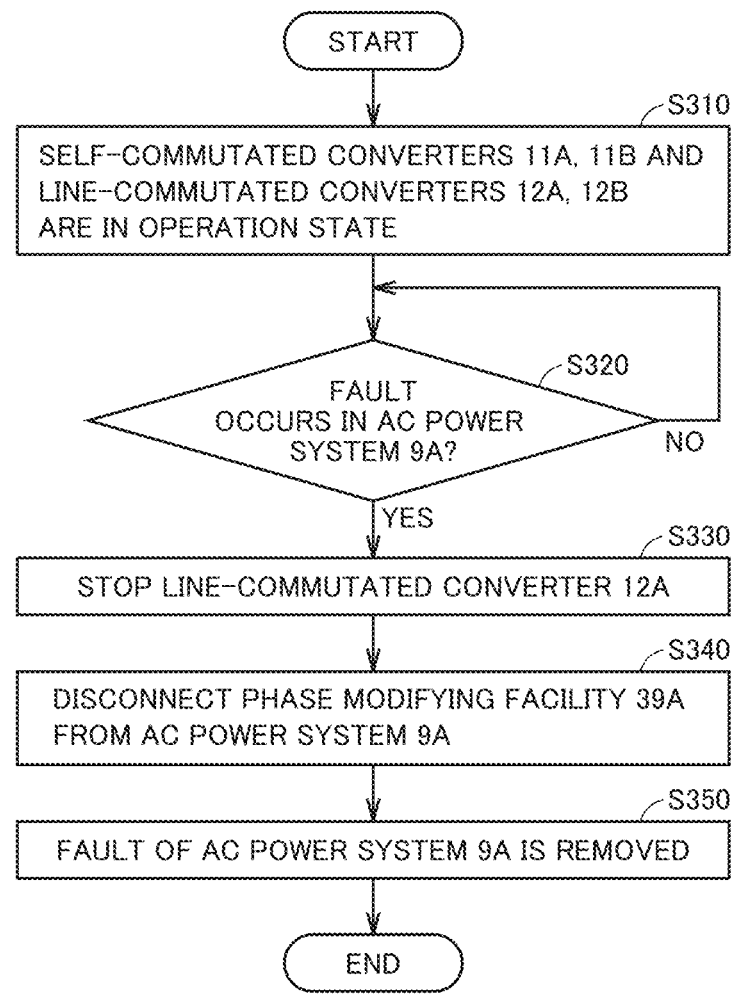
FIG. 11 is a flowchart illustrating a stop procedure of a line-commutated converter when a fault occurs in an AC power system in a bipolar power conversion system according to a fifth embodiment.

FIG. 11 is a flowchart illustrating a stop procedure of the line-commutated converter when a fault occurs in AC power system 9A in the bipolar power conversion system of the fifth embodiment.

In step S310, self-commutated power converters 11A, 11B and line-commutated power converters 12A, 12B are in the operation state.

In next step S320, it is assumed that a fault occurs in AC power system 9A (YES in step S320). Specifically, second-pole control device 34A detects an abnormality of the voltage value (a decrease equal to or less than a threshold, a sudden change in voltage amplitude, or the like) detected by the voltage transformer 25A or an abnormality of the current value (an overcurrent or the like) detected by current transformer 23A. In this case, second-pole control device 34A executes the following steps S330 and S340. Steps S330 and S340 may be executed simultaneously in parallel.

Specifically, in S330, second-pole control device 34A stops line-commutated power converter 12A. More specifically, second-pole control device 34A opens AC circuit breaker 27A, and sets gate voltage supplied to each thyristor constituting line-commutated power converter 12A to zero. Thus, line-commutated power converter 12A stops.

In step S340, second-pole control device 34A opens AC circuit breaker 40A to disconnect phase modifying facility 39A from AC power system 9A. Alternatively, second-pole control device 34A may stop phase modifying facility 39A.

In next step S350, the fault in AC power system 9A is removed. By separating previously phase modifying facility 39A from AC power system 9A, temporary overvoltage due to a rise in system voltage at recovery from the power system fault can be prevented from occurring in self-commutated power converter 11A. As a result, a failure of self-commutated power converter 11A can be prevented from occurring.

Sixth Embodiment

In a sixth embodiment, the case where a ground fault occurs inside line-commutated power converter 12A will be described. In particular, in the sixth embodiment, the case where a zero miss occurs in a sound phase of AC power system 9A will be described.

The stop procedure of the line-commutated converter of the sixth embodiment is not limited to hybrid bipolar power conversion system 10, but can also be used in the case where both the first-pole power converter and the second-pole power converter are self-commutated converters.

Figure 12:
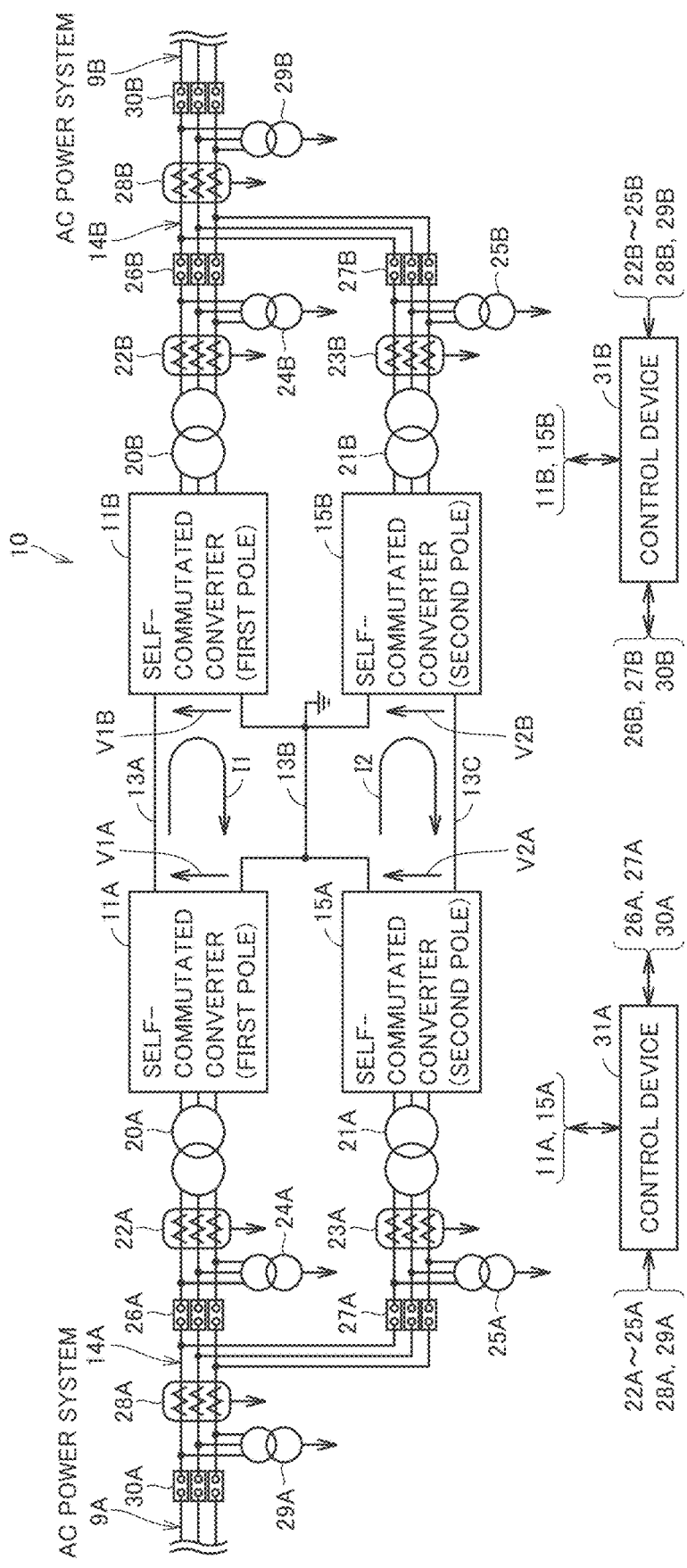
FIG. 12 is a circuit diagram illustrating a modification of the power conversion system in FIG. 1.

FIG. 12 is a circuit diagram illustrating a modification of the power conversion system in FIG. 1. Bipolar power conversion system 10 in FIG. 12 is different from bipolar power conversion system 10 in FIG. 1 in that second-pole power converters 15A, 15B are self-commutated converters. Furthermore, in bipolar power conversion system 10 of FIG. 12, because both the first-pole power converter and the second-pole power converter are constituted by self-commutated converters, phase modifying facilities 39A, 39B and AC circuit breakers 40A, 40B separating phase modifying facilities 39A, 39B from AC power systems 9A, 9B are not provided. Because other points in FIG. 12 are the same as those in FIG. 1, the same or corresponding parts are denoted by the same reference numerals, and the description thereof will not be repeated.

In the following description, it is assumed that first-pole power converters 11A, 11B are self-commutated converters, and second-pole power converters 12A, 12B (15A, 15B) may be either self-commutated or line-commutated.

FIG. 13 is a flowchart illustrating a stop procedure of the second-pole power converter when a ground fault occurs inside the second-pole power converter in the bipolar power conversion system of the sixth embodiment.

In step S410, first-pole power converters 11A, 11B and second-pole power converters 12A, 12B (15A, 15B) are in the operation state.

In next step S420, it is assumed that a ground fault occurs in second-pole power converter 12A (15A) (YES in step S420). Specifically, second-pole control device 34A detects an abnormality of the voltage value (a decrease equal to or less than a threshold, a sudden change in voltage amplitude, or the like) detected by the voltage transformer 25A or an abnormality of the current value (an overcurrent or the like) detected by current transformer 23A.

In subsequent step S430, second-pole control device 34A stops second-pole power converter 12A (15A). Specifically, second-pole control device 34A sets gate voltage supplied to each thyristor included in line-commutated power converter 12A to zero.

In subsequent step S440, common control device 32A detects occurrence of zero miss in a sound phase of AC power system 9A based on the detection result of current transformer 28A. The zero miss means that current does not have a zero point. Because the zero miss occurs, AC circuit breaker 27A cannot be opened.

In subsequent step S450, common control device 32A instructs first-pole control device 33A to output a DC component from first-pole power converter 11A to AC power system 9A. For example, the output of the DC component can be implemented by making the voltage command value of the upper arm different from the voltage command value of the lower arm. Common control device 32A eliminates the zero miss by the output of the DC component.

In subsequent step S460, second-pole control device 34A opens AC circuit breaker 27A based on a command from common control device 32A.

In subsequent step S470, common control device 32A instructs first-pole control device 33A to stop the output of the DC component from first-pole power converter 11A to AC power system 9A.

According to bipolar power conversion system 10 of the sixth embodiment, the zero miss of the sound phase in AC power system 9A can be eliminated by outputting the DC component from first-pole power converter 11A. As a result, because AC circuit breaker 27A provided on the AC system side of second-pole power converter 12A (15A) can be opened, the time until second-pole power converter 12A (15A) in which the ground fault occurs is stopped can be shortened.

Embodiments disclosed here should be understood as being illustrative rather than being limitative in all respects. The scope of the present application is shown not in the foregoing description but in the claims, and it is intended that all modifications that come within the meaning and range of equivalence to the claims are embraced here.

REFERENCE SIGNS LIST

9: AC power system, 10: bipolar power conversion system, 11, 15: self-commutated power converter, 12: line-commutated power converter, 13A, 13C: DC main line, 13B: DC return line, 14: branch point, 20, 21: transformer, 21A1, 21A3, 21B1, 21B3: delta winding, 21A2, 21B2: Y-winding, 22, 23, 28, 50, 51: current transformer, 24, 25, 29: voltage transformer, 26, 27, 30, 40: AC circuit breaker, 31: control device, 33: first-pole control device (first control device), 34: second-pole control device (second control device), 32: common control device, 35: operation command unit, 36: output power command unit, 37: output power distribution unit, 38: communication line, 39: phase modifying facility, 44: leg circuit, 45: upper arm, 46: lower arm, 47: converter cell, 48, 49: reactor, 52: DC voltage detector, 53: DC current detector, 61: switching element, 62: energy storage device, 63: voltage detector, 71N, 71P, 72N, 72P, 73N, 73P: thyristor unit, 71N1, 71P1, 72N1, 72P1, 73N1, 73P1: thyristor, 74: connection point, 80: input converter, 81: sample hold circuit, 82: multiplexer, 83: A/D converter, 84: CPU, 85: RAM, 86: ROM, 87: input and output interface, 88: communication device, 89: auxiliary storage device, 90: bus, 11, 12, Idc: DC current, Iacu, Iacv, Iacw: AC current, Inu, Inv, Inw: Lower arm current, Ipu, Ipv, Ipw: upper arm current, Nn: low potential-side DC terminal, Np: high potential-side DC terminal, Nu, Nv, Nw: AC input terminal, P1, P2: input and output terminal, PrefA, PrefA1, PrefA2: active power command value, QrefA, QrefA1, QrefA2, QrefB: reactive power command value, V1B, V1A, V2A, V2B, Vdc: DC voltage, Vacu, Vacv, Vacw: AC voltage, Vc: capacitor voltage, Vr: rated voltage

The invention claimed is:

1. A power conversion system comprising:
a first self-commutated converter connected between
a first AC power system, and
a first DC main line and a DC return line for first high voltage DC transmission;
a first line-commutated converter connected between
the first AC power system, and
the DC return line and a second DC main line for second high voltage DC transmission;
a second self-commutated converter connected between
a second AC power system, and
the first DC main line and the DC return line;
a second line-commutated converter connected between
the second AC power system, and the DC return line and the second DC main line; and
a control device, wherein
when activating the first self-commutated converter and the first line-commutated converter in a case where the first AC power system is in a power failure state and the second AC power system is in a non-power failure state, the control device activates the first self-commutated converter based on a DC voltage supplied from the second self-commutated converter through the first DC main line and the DC return line, and after completion of activation of the first self-commutated converter, activates the first line-commutated converter.

2. The power conversion system according to claim 1, wherein the control device causes the first self-commutated converter to output capacitive reactive power to the first AC power system after a start of activation of the first line-commutated converter.

3. The power conversion system according to claim 2, wherein a phase modifying facility including static capacitors or shunt reactors for outputting capacitive reactive power is not provided on a first AC power system side of the first line-commutated converter.

4. The power conversion system according to claim 1, wherein
a phase modifying facility including static capacitors or shunt reactors for outputting capacitive reactive power is provided on a first AC power system side of the first line-commutated converter, and
when stopping the first self-commutated converter and the first line-commutated converter, the control device stops the first self-commutated converter, and after completion of a stop of the first self-commutated converter, stops the first line-commutated converter.

5. The power conversion system according to claim 1, wherein
a phase modifying facility including static capacitors or shunt reactors for outputting capacitive reactive power is provided on a first AC power system side of the first line-commutated converter,
when stopping the first self-commutated converter and the first line-commutated converter, the control device starts a stop of the first line-commutated converter and causes the first self-commutated converter to output inductive reactive power to the first AC power system, and
the control device stops the first self-commutated converter after completion of the stop of the first line-commutated converter.

6. The power conversion system according to claim 1, wherein
a phase modifying facility including static capacitors or shunt reactors for outputting capacitive reactive power is provided on a first AC power system side of the first line-commutated converter, and
when detecting occurrence of a fault in the first AC power system, the control device stops the first line-commutated converter and separates the phase modifying facility from the first AC power system.

7. A power conversion system comprising:
a first self-commutated converter connected between
a first AC power system, and
a first DC main line and a DC return line for first high voltage DC transmission;
a first line-commutated converter connected between
the first AC power system, and
the DC return line and a second DC main line for second high voltage DC transmission; and a control device, wherein
when activating the first self-commutated converter and the first line-commutated converter, the control device activates the first self-commutated converter, and after completion of activation of the first self-commutated converter, activates the first line-commutated converter, and
when detecting a single or double line to ground fault inside the first line-commutated converter and detecting an occurrence of a missed zero crossing in a non-faulted phase of the first AC power system, the control device causes the first self-commutated converter to output a DC component for eliminating the missed zero crossing to the first AC power system, and then opens an AC circuit breaker in order to separate the first line-commutated converter from the first AC power system.

8. A control device of a power conversion system, the power conversion system including:
a first self-commutated converter connected between
a first AC power system, and
a first DC main line and a DC return line for first high voltage DC transmission;
a first line-commutated converter connected between
the first AC power system, and
the DC return line and a second DC main line for second high voltage DC transmission;
a second self-commutated converter connected between
a second AC power system, and
the first DC main line and the DC return line; and
a second line-commutated converter connected between
the second AC power system, and
the DC return line and the second DC main line,
the control device comprising:
a first control device to control the first self-commutated converter;
a second control device to control the first line-commutated converter; and
a common control device, wherein
when detecting that voltage at the first AC power system is a zero voltage and that the voltage at the second AC power system is within a rated range, and activating the first self-commutated converter and the first line-commutated converter, the common control device issues an activation command of the first self-commutated converter to the first control device, and after completion of activation of the first self-commutated converter and after detecting that the voltage at the first AC power system is within the rated range, issues an activation command of the first line-commutated converter to the second control device.

9. The control device of the power conversion system according to claim 8, wherein
the common control device issues the activation command of the first line-commutated converter to the second control device, and then outputs a capacitive reactive power command value to the first control device according to inductive reactive power output from the first line-commutated converter to the first AC power system, and
the first control device controls the first self-commutated converter in accordance with the capacitive reactive power command value.

10. The control device of the power conversion system according to claim 9, wherein a phase modifying facility including static capacitors or shunt reactors for outputting capacitive reactive power is not provided on a first AC power system side of the first line-commutated converter.

11. The control device of the power conversion system according to claim 8, wherein
- a phase modifying facility including static capacitors or shunt reactors for outputting capacitive reactive power is provided on a first AC power system side of the first line-commutated converter, and
- when stopping the first self-commutated converter and the first line-commutated converter, the common control device issues a stop command of the first self-commutated converter to the first control device, and after completion of a stop of the first self-commutated converter, issues a stop command of the first line-commutated converter to the second control device.

12. The control device of the power conversion system according to claim 8, wherein
- a phase modifying facility including static capacitors or shunt reactors for outputting capacitive reactive power is provided on a first AC power system side of the first line-commutated converter,
- when stopping the first self-commutated converter and the first line-commutated converter, the common control device issues a stop command of the first line-commutated converter to the second control device and issues an inductive reactive power command to the first control device according to capacitive reactive power output from the phase modifying facility to the first AC power system,
- the first control device controls the first self-commutated converter in accordance with the inductive reactive power command, and
- the common control device issues a stop command of the first self-commutated converter to the first control device after completion of a stop of the first line-commutated converter.

13. The control device of the power conversion system according to claim 8, wherein
- a phase modifying facility including static capacitors or shunt reactors for outputting capacitive reactive power is connected to a first AC power system side of the first line-commutated converter with a first AC circuit breaker interposed therebetween, and
- when detecting occurrence of a fault in the first AC power system, the common control device issues a stop command of the first line-commutated converter to the second control device, and disconnects the phase modifying facility from the first AC power system by opening the first AC circuit breaker.

14. The control device of the power conversion system according to claim 8, wherein
- the power conversion system further includes a second AC circuit breaker provided between the first line-commutated converter and the first AC power system, and
- when detecting a single or double line to ground fault inside the first line-commutated converter and detecting an occurrence of a missed zero crossing in a non-faulted phase of the first AC power system, the common control device instructs the first control device to output a DC component in order to eliminate the missed zero crossing in the first AC power system by the first self-commutated converter, and then opens the second AC circuit breaker.

* * * * *